Sept. 18, 1934.   R. W. GLASNER ET AL   1,974,214
MACHINE FOR MANUFACTURING BUSHINGS
Filed Dec. 11, 1930   3 Sheets-Sheet 1
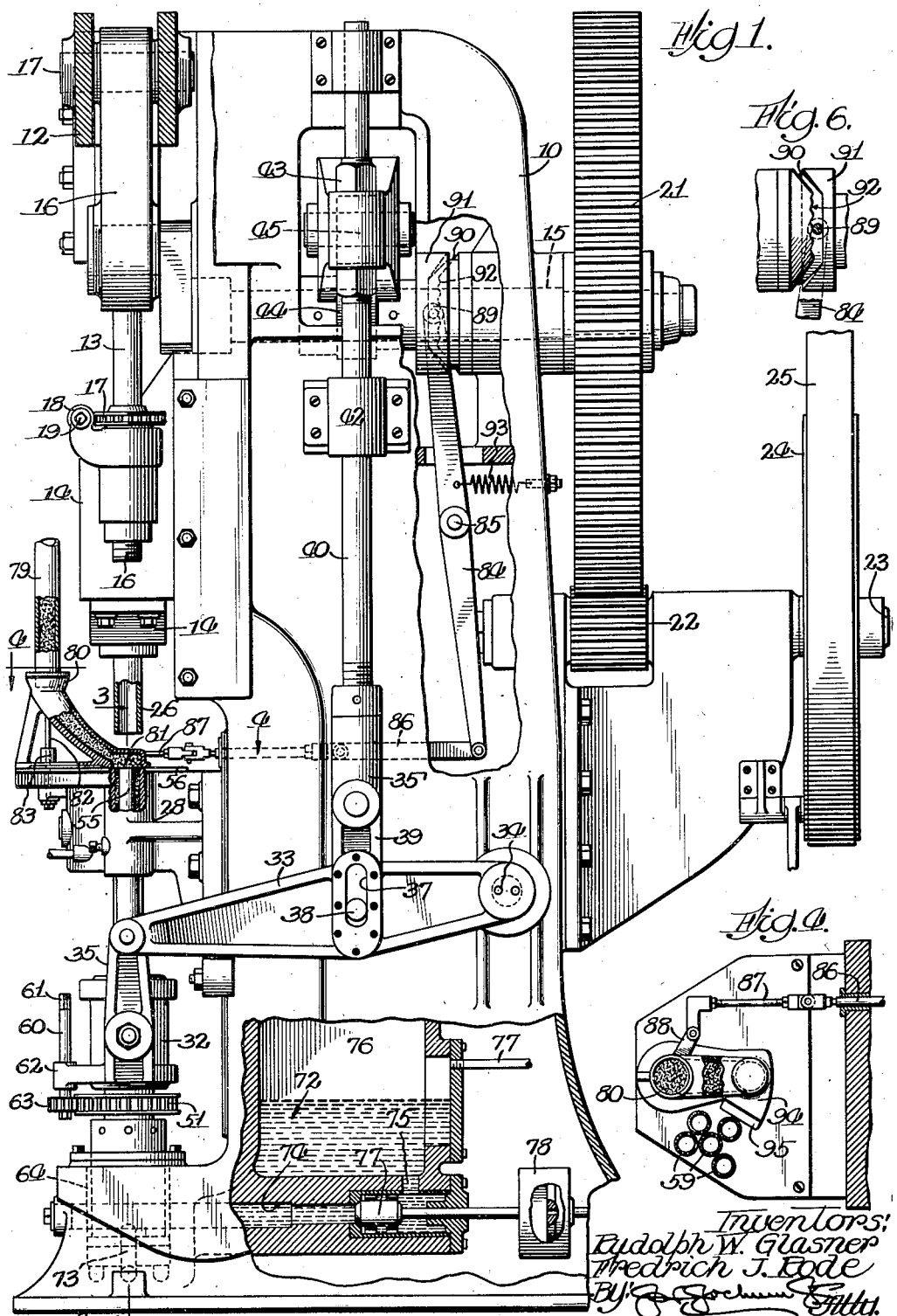

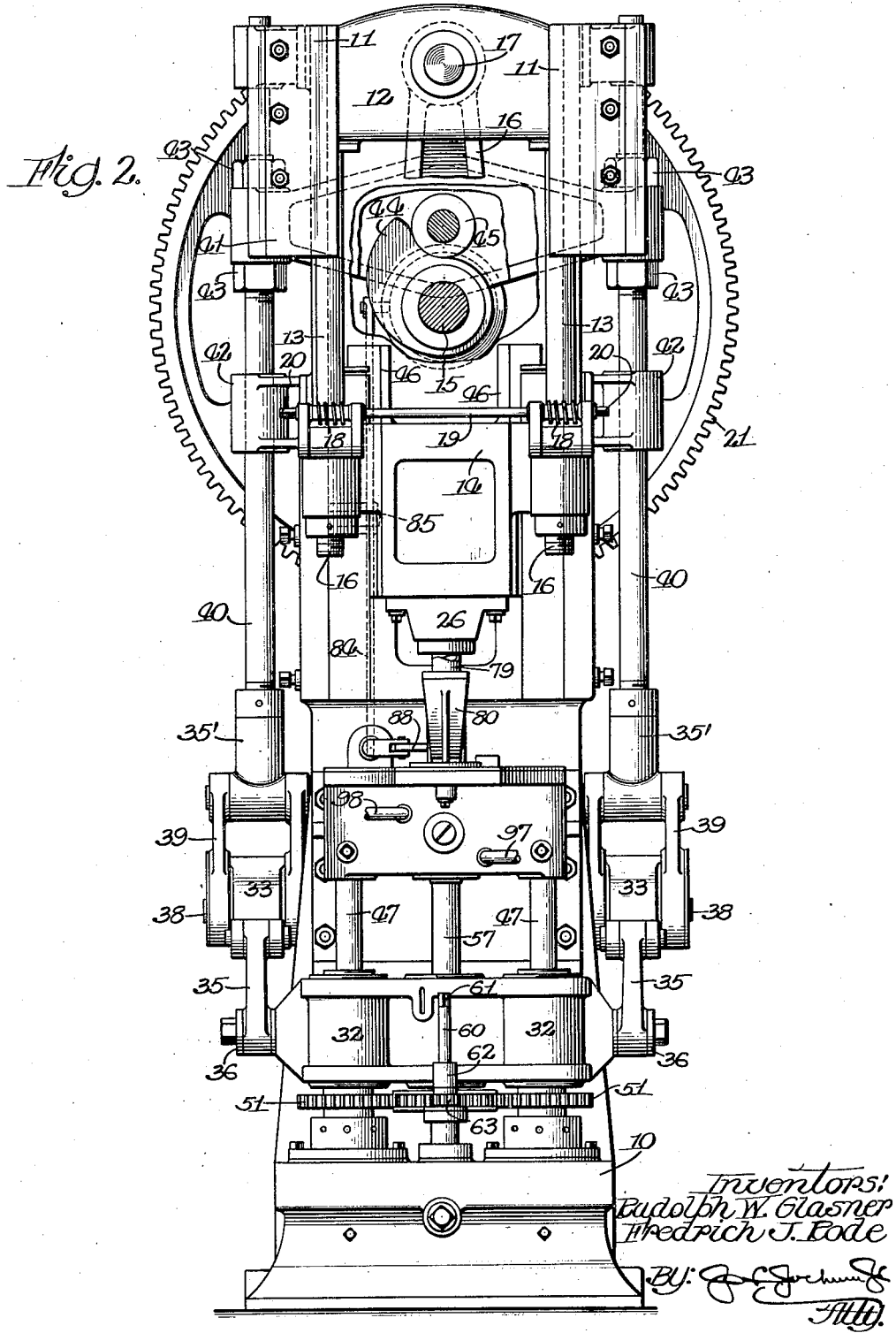

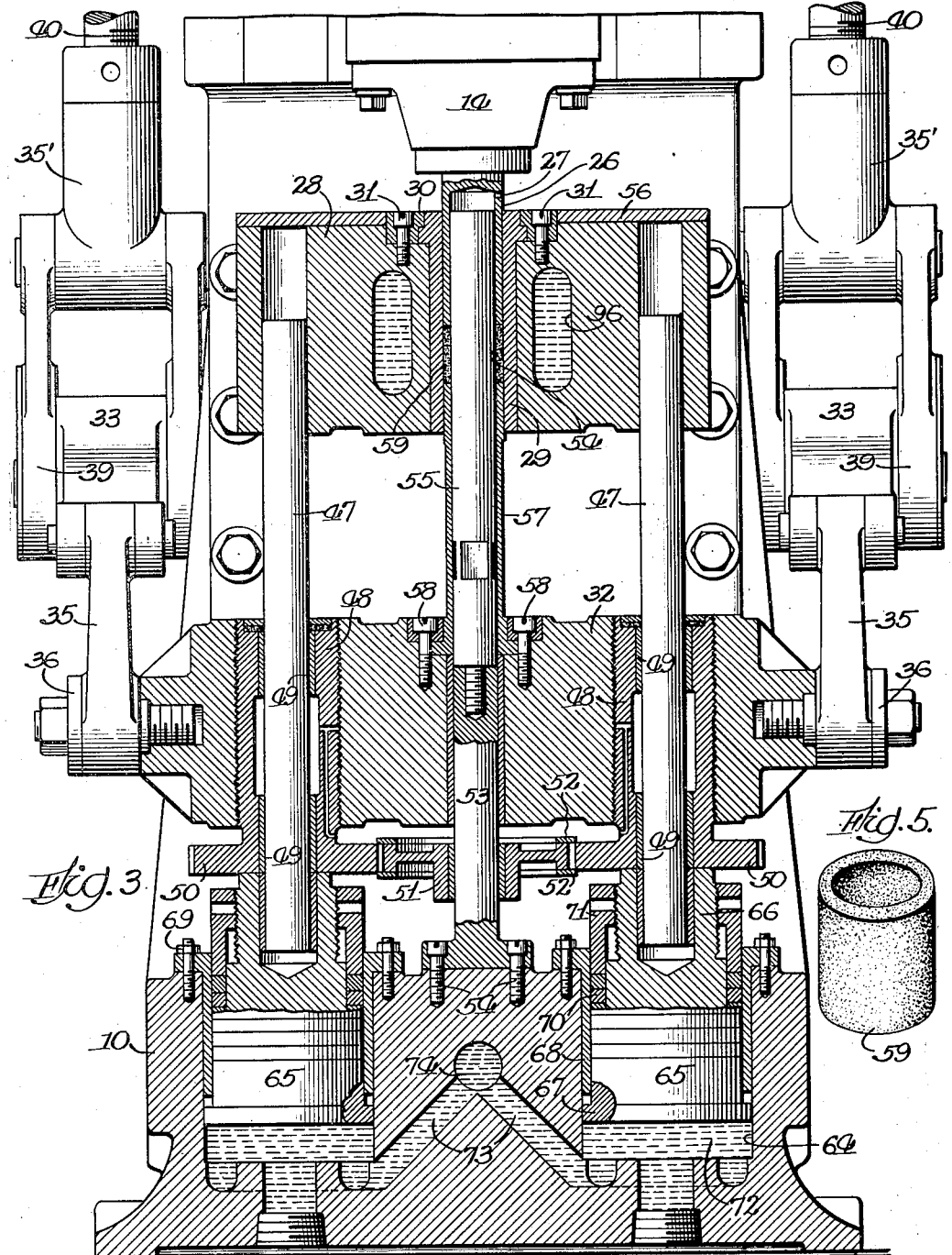

Patented Sept. 18, 1934

1,974,214

UNITED STATES PATENT OFFICE 1,974,214

MACHINE FOR MANUFACTURING BUSHINGS

Rudolph W. Glasner and Fredrich J. Rode, Chicago, Ill., assignors to Marquette Tool & Mfg. Company, Chicago, Ill., a corporation of Illinois Application December 11, 1930, Serial No. 501,738

6 Claims. (Cl. 78—13)

This invention relates to improvements in machines for manufacturing bushings, and one of the objects of the invention is to provide an improved machine of this character for compressing pulverized material into tubular bushings, and improved means whereby the size or length of the bushings may be varied at will.

A further object is to provide in a machine of this character cushioning means for creating a yielding resistance pressure against the work during the forming thereof, and means whereby such resistance pressure may be varied.

A further object is to provide an improved shaping die, a portion of which operates as an ejector for removing or ejecting the bushing at a predetermined time in the cycle of operation of the machine.

A further object is to provide improved means for supplying or feeding the material into the die, and improved means for displacing the completed bushing after it is completed and ejected from the forming die.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in side elevation, partly broken away and partly in section, with parts omitted, of a machine of this character constructed in accordance with the principles of this invention.

Figure 2 is a left hand or front elevation of Figure 1.

Figure 3 is an enlarged detail sectional view taken on line 3—3, Figure 1.

Figure 4 is a detail sectional view taken on line 4—4, Figure 1.

Figure 5 is a detail perspective view of the bushing.

Figure 6 is a view of the shifting and vibrating cam for the supply hopper and chute.

Referring more particularly to the drawings the numeral 10 designates a supporting structure constituting the frame of the machine, and reciprocable in guides 11 is a cross head 12, which has connected with it and depending therefrom rods or hanger members 13, to which a ram 14 is secured in any suitable manner.

The ram is reciprocated by means of a crank shaft 15, to which a link or crank arm 16 is secured, and which in turn is pivotally connected as at 17 with the cross head 12.

The ram 14 is adjustably secured to the rods or hangers 13 in any suitable manner, preferably through the medium of screws 16 and connected with each of the screws is a worm gear 17. Cooperating with the worm gear 17 are worms 18 which are secured to a shaft 19 journaled in suitable bearings, and each end of the shaft 19 is preferably angular in cross section as at 20 for the reception of a tool or implement by means of which the shaft 19 may be rotated. As the worms 18 mesh with the gears 17, it will be manifest that when the shaft 19 is rotated the ram 14 will be adjusted toward or away from the head 12.

The shaft 15 is rotated in any desired or suitable manner preferably from a gear 21 secured to the shaft, and with this gear 21 a gear 22 meshes, the latter being secured to a shaft 23 to which a drive pulley 24 is also connected. A belt 25 passes over the pulley 24, and the belt receives its motion from any suitable source of power, so as to rotate the shaft 23 and thereby rotated the gears 22—21 to impart a rotary motion to the crank shaft 15.

Carried by the ram 14 is a tubular plunger 26 which is preferably provided with a vent opening 27 to permit the escape of air. This plunger 26 is reciprocable into and out of a die member 28 which is provided with a chamber therein, the chamber being formed by a tubular member 29 seated and secured within an opening in the die member 28. The tubular member 29 is removable so as to vary, if desired, the diameter of the bushing to be formed.

The tubular member 29 may be secured in position in any suitable manner such as by means of a clamping ring 30 secured in position by means of fastening devices 31.

This die 28 is fixed against movement and is supported by the frame of the machine, as shown more clearly in Figure 1.

Arranged on the other side of the die 28 is a support 32 which is adapted to be elevated by means of arms 33 pivotally mounted at one end as at 34, preferably upon the frame of the machine. Connected to each of the arms 33 is a link 35, the free end of each link is pivotally connected as at 36 with the support 32. Each arm 33 is preferably provided with a slot 37 in which a pin 38 operates, and the pin 38 is connected with a link 39, which in turn is connected by a bar or rod 40 with another cross head 41. The bars or rods 40 pass through suitable guides or bearings 42 and may be adjustably secured to the cross head 41 by fastening nuts or collars 43 threaded upon the bars or rods.

The slots 37 in the arms 33 provide a lost motion between the links 35 and the arms 33.

Connected to the crank shaft 15 is a cam 44 which co-operates with a roller 45 journaled upon the cross head 41, so that as the crank shaft 15 is rotated the cam 44 will be rotated in the direction indicated by the arrow in Figure 2, and is so shaped that in its co-operation with the roller 45 on the cross head 41, the latter will be raised at a predetermined time in the cycle of operation of the machine, to raise the support 32, for a purpose to be set forth.

As the ram 14 is reciprocated in the guides 46 and the cam 44 rotated, the support 32 will be maintained stationary until the cam 44 operates upon the roller 45 to raise the head 41.

After the roller 45 passes off of the cam 44 it will drop to the position shown in Figure 2, and thereby permit the support 32 to descend to its lowermost position.

The support 32 is guided in its movement by means of depending rods 47 secured to the die member 28, and these rods 47 pass through the support 32 preferably through screw members 48 extending through the support and having threaded engagement with the support. Bushings 49 may be provided between the rods 47 and the support 32, and secured to each of the members 48 is a gear 50, each of which meshes with a gear 51 intermediate thereof, and the gear 51 is held against falling by means of flanges 52 thereon which extend beyond or overhang the edges of the gears 50.

The gear 51 is laterally movable upon an upright 53 which is secured as at 54 to the base of the supporting structure 10 and this member 53 projects through the support 32 and into a chamber 54 formed in the die 28 and into which chamber the tubular plunger 26 projects.

The upright 53 may be of sectional construction as shown in Figure 3, so that the upper portion 55 thereof may be detached and another portion similar thereto but of a different diameter, may be secured to the support 53. The portion 55 constitutes a core for the die or mold and is of a diameter somewhat less than the internal diameter of the member 29 so as to form a space therebetween, and the upper end of the member 55 preferably terminates flush with the top of the die 28 or a plate 56 which is secured to the upper face of the die.

Telescoped with the core or portion 55 is a tubular member 57 which is secured as at 58 to the support 32, and this member 57 telescopes into the chamber 54 of the die 28 and is in alinement with the tubular plunger 26.

The ram 14 carrying the tubular plunger 26 reciprocates with a set throw and the support 32 is always maintained in a fixed position with respect to such throw. Therefore, in order to vary the fixed position of the support 32 with respect to the throw of the ram 14 so as to vary the length of the bushings 59 formed in the chamber 54 by compressing the material between the plunger 26 and the member 57, the members 48 are rotated through the medium of a shaft 60, having an angular extremity 61 and journaled in a suitable bearing 62. Connected with the shaft 60 is a gear 63 which meshes with the gear 51 so that by rotating the shaft 60 the members 48 will also be rotated, and this will cause the support 32 to be moved in a direction toward or away from the die 28, according to the direction of rotation of the members 48.

The member 32, when the ram 14 descends and the plunger 26 is telescoped over the end of the core 45 so as to move into the chamber 54 and contact the material to form the bushing 59, will move in a direction away from the die 28 under the stress of the ram for the reason that the material or bushing 59 being shaped is compressed between the plunger 26 and the tubular member 57. During this compression action the member 57 will be forced downwardly as will also the support 32.

This movement of the support 32 will be yieldingly resisted by means of fluid pressure resistance cushions, any number of which may be provided, and these cushioning devices are formed as an integral part or constitutes a part and parcel of the supporting structure of the machine.

Each of the cushioning devices comprises a cylinder or chamber 64 as an integral part of the supporting structure and reciprocable in each of the cylinders is a piston 65 having a portion 66 which extends for a considerable distance beyond the top of the cylinder 64. Each of the pistons is preferably provided with a peripheral shoulder 67 at the lower end thereof adapted to engage the end of a tubular member 68 which extends into the cylinder and over the top of the shoulder 67 to form a stop for limiting the upward movement of the piston 65. This tubular member 68 is secured in position by means of suitable fastening devices 69 and the diameter of the piston 65 adjacent the tubular member 68 is sufficient so as not to cause any retarding movement of the piston in the cylinder. Piston rings 70 encompass the piston and rest upon the shoulder 67. A member 71 co-operates with the shoulder 67 for securing the packing or piston rings 70 in position.

The portion 66 of the pistons 65 projects for a sufficient distance beyond the respective cylinders 64 so as to form a stop or abutment for the support 32. The pistons 55 are held elevated by means of fluid pressure, presently to be described, so that when the support 32 is lowered under the pressure of the ram and as shown more clearly in Figure 3, the pistons will move in the cylinders against the fluid pressure therein, thereby creating a yielding resistance pressure to the movement of the pistons, by forcing the liquid 72 out of the passages 73 into a passage 74 that has communication as at 75 with a fluid pressure tank 76. Pressure is supplied to the tank 76 above the liquid 72 from any suitable source and at any predetermined pressure, and the pressure in the tank 76 above the liquid 72 operates to force the latter out of the opening 75, through the passage 74, passage 73, into the respective cylinders 64 to raise the pistons when the ram has receded.

The fluid resistance pressure in the chambers 64 may be varied in any suitable manner, preferably by means of a valve 77 controlling the passage 74, and which valve 77 is itself controlled by fluid pressure means 78. Therefore, by varying the pressure against which the valve 77 must be unseated the resistance pressure of the fluid may be correspondingly varied.

The core 55 is preferably of a length to terminate adjacent and flush with the top of the die 28 or upper surface of the plate 56 and the material to be compressed is supplied from a suitable source through a pipe or conduit 79, which discharges into a hopper or chute 80, having a discharge outlet 81 on the bottom thereof and which outlet moves over the plate 56 when not in register with the chamber 54 so that the outlet will be closed thereby. The hopper 80 is mounted for a pivotal movement in any desired or suitable manner, preferably by means of an upright 82 journaled in suitable bearings 83, and is adapted to be swung about the pivot by any suitable means, such as by means of a lever 84 pivotally mounted intermediate its ends as at 85. One end of the lever is connected by means of links 86—87 with an arm 88 that is connected with the hopper 80. To the other end of the lever 84 is connected a roller 89 that runs in a groove 90 of a cam 91 preferably connected with the shaft 15. A portion of the wall of the cam groove 90 is undulated as at 92.

As the cam 91 rotates the roller 89 will move in the groove 90 thereof so as to swing the hopper 80 about its pivot to cause the opening 81 to be brought into and out of register with the chamber 54 in the die 28. After the hopper has been positioned as shown in Figure 1, the cam 91 will move to such a position that the undulated portion 92 will contact with the roller 89 and thereby vibrate or impart a vibratory movement to the lever 84, causing the hopper 80 to be agitated or vibrated, thereby insuring the proper feeding of the material from the hopper 80 through the discharge opening 81.

A spring 93 is provided for maintaining the roller 89 against the undulated portion 92 of the cam 91.

The end of the hopper is preferably extended as at 94 (see particularly Figure 4) to form an inclined portion 95 which is adapted when the hopper is swung to a position to move the outlet 81 in register with the chamber 54 of the die 28, to engage and move the completed and ejected bushings 59 out of the way.

It is thought that the operation of this machine will be clearly understood from the foregoing, but briefly stated it is as follows.

In the normal position, the ram 14 is elevated and the tubular die 26 will be positioned as shown in Figure 1. The support 32 will be lowered and the cavity or space between the outer periphery of the core 55 and the tubular member 29 of the die 28 will receive the pulverized material discharged through the outlet opening 81. As the cam 91 revolves the hopper 80 will be vibrated to insure the supply of material being delivered into the die. A further rotation of the cam 91 in the same direction will swing the hopper about its pivot away from the chamber and the outlet opening 81 will be closed by the plate 56. The ram 14 will then descend and the tubular plunger 26 will move into the chamber 54 and telescope with the core 55, forcing the material 59 downwardly in the chamber and co-operating with the tubular member 57 to compress the material therebetween.

As the ram descends the support 32 will be lowered under the stress of the ram and this lowering movement of the support will be yieldingly resisted by the pressure cushions, and as the support 32 is lowered the arms 33 will be rocked downwardly about their pivots 34. The pin and slot connection 37—38 between the link 35 and arms 33 will permit of such a movement.

After the material has been compressed and the ram starts to ascend, the cam 44 will operate to raise the cross head 41, together with the rods 40 and links 35.

This raising movement will cause the pins 38 to move upwardly in the slot 37 until the pins reach the end of the slots, at which time the arms 33 will be raised and this will in turn raise the support 32 together with the tubular member 57, the latter then acting as an ejector to eject the finished product from the chamber 54 of the die 28.

The member 57 will travel upwardly until the upper end thereof is substantially flush with the upper surface of the die 28 or plate 56. A continued operation of the crank shaft 15 will cause the cam 44 to move in a direction to allow the support 32 together with the arms 33 to lower, carrying with them the tubular member 57 so as to provide a space in the chamber 54 for the reception of another supply of material. Before the tubular plunger 26 enters the chamber 54, the hopper 80 will be swung about its pivot by the cam 91 to move the outlet opening 81 in register with the chamber 54 to discharge material thereinto. The hopper will then be vibrated by the undulations 92 of the cam 91 and the hopper will then be swung about its pivot to be moved out of the way so as to permit the plunger 26 to enter the chamber and compress another supply. As the hopper 80 is moved into a position to discharge material into the chamber 54, the portion 94—95 of the hopper will engage the completed bushing and move the same out of the way.

In order to prevent the die 28 from heating there may be provided a chamber 96 through which a cooling medium may be circulated, the same entering the chamber through an inlet pipe 97 and discharging therefrom through an outlet pipe 98.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a machine for compressing pulverized material, a chamber, means for supplying the material to said chamber and embodying a chute the discharge end of which is movable into and out of register with the chamber, means for thus moving the chute, and means for ejecting the finished work from the chamber into a position to be engaged and moved out of the way by the chute when the latter is positioned to deliver material into the chamber.

2. In a machine for compressing pulverized material, a chamber, means for supplying the material to said chamber and embodying a chute the discharge end of which is movable into and out of register with the chamber, means for thus moving the chute, means for ejecting the finished work from the chamber into a position to be engaged and moved out of the way by the chute when the latter is positioned to deliver material into the chamber, and means for vibrating the chute when the discharge end thereof is in register with said chamber.

3. In a machine for compressing pulverized material, a chamber, means for supplying the material to said chamber and embodying a chute the discharge end of which is movable into and out of register with the chamber, means for thus moving the chute, means for ejecting the finished work from the chamber into a position to be engaged and moved out of the way by the chute when the latter is positioned to deliver material into the chamber, and a surface over which the discharge opening of the chute moves to form a closure therefor when the said opening is out of register with said chamber.

4. A machine for compressing pulverized material embodying a stationary support, a die mounted upon the support and having a chamber therein, a movable support on one side of the die, a member mounted upon the support and projecting into said chamber, a reciprocable member on the other side of the die, a plunger carried by the reciprocable member, operable in the said chamber and co-operating with the first said member to compress the material therebetween, a crank shaft, an operative connection between the crank shaft and the reciprocable member for reciprocating the latter, a cam on the crank shaft, a cross head adapted to be engaged and moved by the cam, a lever pivotally mounted at one end on said stationary support, a connection between the lever and the cross head, a link connection between the lever and said movable support whereby the latter will be moved towards said die, the said support being moved in the opposite direction by the stress of the said reciprocable member, and cushioning means for yieldingly resisting the movement of the support under the stress of said reciprocable member.

5. A machine for compressing pulverized material embodying a stationary support, a die mounted upon the support and having a chamber therein, a movable support on one side of the die, a member mounted upon the support and projecting into said chamber, a reciprocable member on the other side of the die, a plunger carried by the reciprocable member, operable in the said chamber and co-operating with the first said member to compress the material therebetween, a crank shaft, an operative connection between the crank shaft and the reciprocable member for reciprocating the latter, a cam on the crank shaft, a cross head adapted to be engaged and moved by the cam, a lever pivotally mounted at one end on said stationary support, a connection between the lever and cross head, a link connection between the lever and said movable support whereby the latter will be moved towards said die, the said support being moved in the opposite direction by the stress of the said reciprocable member, a cushioning device embodying a fixed and freely movable element for yieldingly resisting the movement of the support under the stress of said reciprocable element, and an adjustable stop carried by said movable support for engagement with said freely movable element of the cushioning device, whereby the size of the material receiving chamber may be varied at will.

6. A machine for compressing pulverized material embodying a stationary support, a die mounted upon the support and having a chamber therein, a movable support on one side of the die, a member mounted upon the support and projecting into said chamber, a reciprocable member on the other side of the die, a plunger carried by the reciprocable member operable in the said chamber and co-operating with the first said member to compress the material therebetween, a crank shaft, an operative connection between the crank shaft and the reciprocable member for reciprocating the latter, a cam on the crank shaft, a cross head adapted to be engaged and moved by the same, a lever pivotally mounted at one end on said stationary support, a connection between the lever and the cross head, a link connection between the lever and said movable support whereby the latter will be moved towards said die, the said support being moved in the opposite direction by the stress of the said reciprocable member, cushioning means for yieldingly resisting the movement of the support under the stress of said reciprocable member, and means for varying at will the extent to which the first said member will project into the said chamber.

RUDOLPH W. GLASNER.
FREDRICH J. RODE.